Patented Aug. 7, 1934

1,969,354

UNITED STATES PATENT OFFICE 1,969,354

3-CARBOXY-4-ALKOXY-DIPHENYL AND SALTS THEREOF

Walter G. Christiansen, Glen Ridge, N. J., and Adelbert W. Harvey, Pittsburgh, Pa., assignors to E. R. Squibb & Sons, Brooklyn, N. Y., a corporation of New York No Drawing. Application August 6, 1932, Serial No. 627,806

13 Claims. (Cl. 260—111)

This invention relates to 3-carboxy-4-alkoxy-diphenyls and salts thereof, and more particularly to the ethoxy and butoxy derivatives and their alkali metal salts. The invention includes the new products and method of preparing them. These compounds are valuable as intermediates in the production of compounds having therapeutic value, particularly anaesthetics.

The 3-carboxy-4-alkoxy-diphenyls are advantageously prepared from 3-carboxy-4-hydroxy-diphenyl which may be prepared by the method disclosed in the application of Adelbert W. Harvey, Serial No. 615,473, filed June 4, 1932, now Patent No. 1,941,207 of Dec. 26, 1933. The hydrogen of the phenol group and the hydrogen of the carboxyl group of 3-carboxy-4-hydroxy-diphenyl are replaced first by an alkali metal such as sodium and then by an alkyl group. This alkyl ester is then saponified and the alkoxy derivative of the acid formed.

The course of the reaction may be represented by the following series of compounds in which R is an alkyl group:

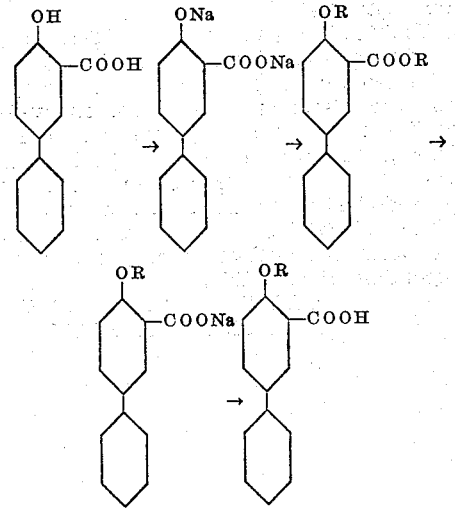

The preparation of the ethoxy and butoxy derivatives of 3-carboxy-diphenyl is given below to illustrate the preparation of the compounds of this invention, but it is to be understood that the invention is not limited thereto.

Example 1.—170 grams of 4-hydroxy-diphenyl is converted into the sodium phenolate by heating to boiling with 40 grams of sodium hydroxide in 400-600 cc. of solution. The sodium phenolate may be recovered by direct evaporation over a free flame or by any other suitable method of evaporation. Care should be taken to prevent absorption of carbon dioxide by the solution or the wet mass during evaporation. Final drying of the phenolate is carried out in vacuo, about 10 mm., at 180° C. for some time, usually 5 hours, after no more water is collected in an ice trap.

The dry pulverized phenolate is treated with carbon dioxide in an autoclave at approximately 90 pounds per square inch to form the sodium salt of 3-carboxy-4-hydroxy diphenyl. The temperature is held at 110–120° C., for 1 hour, increased to 160–170° C., and held at the latter temperature for 3-4 hours. The reaction product is placed in 3000-4000 cc. of water, heated to boiling, and then preferably after filtering treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

214 grams of 3-carboxy-4-hydroxy-diphenyl is converted into the di-sodium derivative (sodium salt and sodium phenolate) by treatment with 80 grams of sodium hydroxide dissolved in 3000-4000 cc. of water. The mixture is boiled until all of the 3-carboxy-4-hydroxy-diphenyl has been dissolved and is then evaporated to dryness. Final drying is conveniently carried out by placing in an oven at 105–110° C. for several hours. The dry di-sodium compound is treated with 154 grams of ethyl sulfate, or more conveniently with a considerable excess over this amount, and heated for 3-4 hours at 145° C. During the early stages of heating, at 105–120° C., a small quantity of alcohol and ether is distilled off after which no further distillation takes place. Care must be taken to control the temperature to prevent decomposition of the ethyl sulfate with possible sulfonation of the 3-carboxy-4-hydroxy or the resulting ethylated derivative. Following the reaction period, the greater part of any excess of ethyl sulfate is removed by distillation in vacuo at a pressure of 13 mm. at about 100° C. The residue, which consists largely of sodium sulfate or sodium ethyl sulfate, depending on the excess of ethyl sulfate used, a small amount of ethyl sulfate and the ethyl ester of 3-carboxy-4-ethoxy-diphenyl is conveniently separated by boiling with water and mechanical separation of the hot aqueous solution from the water insoluble ester.

The free acid, 3-carboxy-4-ethoxy-diphenyl, is made from the ethyl ester by saponification with sodium hydroxide and precipitation with a mineral acid, such as hydrochloric. The free acid is then purified by recrystallization from a suitable solvent such as ethyl alcohol. In its pure form 3-carboxy-4-ethoxy-diphenyl crystallizes from alcohol as large white needles with a melting point of 141.1–141.8° C. (corrected). The compound is soluble in alcohol, ether, benzene and chloroform.

Example 2.—42.8 grams (0.2 mole) of 3-carboxy-4-hydroxy-diphenyl is converted into the di-sodium derivative by treatment with 16 grams of sodium hydroxide dissolved in 600–800 cc. of water. The mixture is boiled until all of the 3-carboxy-4-hydroxy-diphenyl has been dissolved and is then evaporated to dryness. Final drying is conveniently carried out by placing in an oven at 105–110° C. for several hours.

The dry di-sodium compound is treated with an excess over 54.8 grams (0.4 mole) of n-butyl bromide and heated preferably in a closed vessel in a bath maintained at 130° C. for 5 hours. After cooling, the n-butyl ester of 3-carboxy-4-n-butoxy-diphenyl and excess of n-butyl bromide is filtered from the by-product sodium bromide and the excess of n-butyl bromide removed by distillation. The residue consists principally of the n-butyl ester of 3-carboxy-4-n-butoxy-diphenyl.

The free acid, 3-carboxy-4-n-butoxy-diphenyl, is obtained by saponification of its n-butyl ester with dilute aqueous-alcoholic solution of sodium hydroxide and precipitation of the free acid from the resulting sodium salt by acidification with mineral acid, such as hydrochloric acid. It is preferable to remove the greater part of the alcohol from the saponification mixture before the acid precipitation.

The compound may be filtered off, dried and purified by crystallization from a mixture of benzene and petroleum ether, or from approximately 60 per cent alcohol. The pure material crystallizes in pure white crystals with a melting point of 83.5–84.5° C. (corrected).

The compound is soluble in alcohol, ether, benzene, chloroform and several other organic solvents. It is useful as an intermediate in the preparation of local anaesthetics and other synthetic derivatives.

Other alkoxy derivatives of 3-carboxy-diphenyl may be prepared by using other alkyl halides or salts such as methyl sulphate in the preparation of the methoxy derivative and alkyl sulfites or para toluene sulfonates for the preparation of derivatives containing more than two carbon atoms in the alkoxy group.

Salts of the 3-carboxy-4-alkoxy-diphenyls may be prepared by dissolving the carboxy acid in a solution containing the chemical equivalent in sodium hydroxide or other suitable alkali and evaporating to dryness in case the dry salt is desired, or using the solution as such if a solution of the salt is desired.

We claim:

1. A compound having the formula:

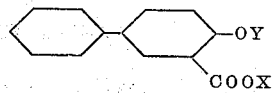

where Y is an alkyl group and X is hydrogen or an alkali metal.

2. 3-carboxy-4-alkoxy-diphenyls.

3. 3-carboxy-4-ethoxy-diphenyl.

4. 3-carboxy-4-n-butoxy-diphenyl.

5. Alkali metal salts of the 3-carboxy-4-alkoxy-diphenyls.

6. The sodium salt of 3-carboxy-4-ethoxy-diphenyl.

7. The sodium salt of 3-carboxy-4-n-butoxy-diphenyl.

8. The method of preparing 3-carboxy-4-alkoxy-diphenyls, which comprises converting 3-carboxy-4-hydroxy-diphenyl to its di-alkali metal derivative, replacing each alkali metal atom by an alkyl group and saponifying the resulting ester.

9. The steps in the preparation of 3-carboxy-4-alkoxy-diphenyls which comprise forming the di-sodium derivative of 3-carboxy-4-hydroxy-diphenyl by treating 3-carboxy-4-hydroxy-diphenyl with sodium hydroxide to form the di-sodium salt and then converting the sodium phenolate to the alkoxy derivative.

10. The method of preparing 3-carboxy-4-alkoxy-diphenyls which comprises saponifying an ester of a 3-carboxy-4-alkoxy-diphenyl.

11. The step in the preparation of 3-carboxy-4-alkoxy-diphenyls which comprises heating the di-alkali metal salt of 3-carboxy-4-hydroxy-diphenyl with at least two molecular proportions of an alkyl salt to form the alkyl ester of 3-carboxy-4-alkoxy-diphenyl.

12. The step in the preparation of 3-carboxy-4-alkoxy-diphenyls having no more than two carbon atoms in the alkoxy group which comprises heating the di-sodium salt of 3-carboxy-4-hydroxy-diphenyl with at least two molecular proportions of the corresponding alkyl sulphate.

13. The step in the preparation of 3-carboxy-4-alkoxy-diphenyls which comprises heating the di-sodium salt of 3-carboxy-4-hydroxy-diphenyl with at least two molecular proportions of the corresponding alkyl halide.

WALTER G. CHRISTIANSEN.
ADELBERT W. HARVEY.